(12) United States Patent
Bergquist et al.

(10) Patent No.: US 11,317,317 B2
(45) Date of Patent: Apr. 26, 2022

(54) METHODS AND APPARATUS RELATING TO BUFFER STATUS REPORTS IN A WIRELESS COMMUNICATION NETWORK

(71) Applicant: Telefonaktiebolaget LM Ericsson (publ), Stockholm (SE)

(72) Inventors: Gunnar Bergquist, Kista (SE); Björn Hofström, Linköping (SE); Mikael Wittberg, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 209 days.

(21) Appl. No.: 16/078,125

(22) PCT Filed: Jun. 14, 2018

(86) PCT No.: PCT/SE2018/050622
§ 371 (c)(1),
(2) Date: Aug. 21, 2018

(87) PCT Pub. No.: WO2018/231137
PCT Pub. Date: Dec. 20, 2018

(65) Prior Publication Data
US 2020/0187046 A1   Jun. 11, 2020

Related U.S. Application Data

(60) Provisional application No. 62/520,823, filed on Jun. 16, 2017.

(51) Int. Cl.
*H04W 28/02* (2009.01)
*H04W 72/04* (2009.01)
(Continued)

(52) U.S. Cl.
CPC ... *H04W 28/0278* (2013.01); *H04W 72/0453* (2013.01); *H04W 72/10* (2013.01); *H04W 72/1284* (2013.01)

(58) Field of Classification Search
None
See application file for complete search history.

(56) References Cited

U.S. PATENT DOCUMENTS

| 2011/0130098 A1* | 6/2011 | Madan | H04W 24/02 455/63.1 |
| 2011/0205906 A1* | 8/2011 | Yi | H04W 80/02 370/241 |

(Continued)

OTHER PUBLICATIONS

Huawei, et al., "BSR Format", 3GPP TSG-RAN WG2 #98, R2-1705201, Huawei, HiSilicon, Hangzhou, China, May 15-19, 2017, 4 pages.

(Continued)

*Primary Examiner* — Gregory B Sefcheck
*Assistant Examiner* — Amarnauth G Persaud
(74) *Attorney, Agent, or Firm* — Murphy, Bilak & Homiller, PLLC

(57) ABSTRACT

One aspect of the disclosure provides a method for a terminal device in a wireless communications network, wherein the terminal device is configurable with a plurality of logical channel groups. The method comprises generating buffer status information and transmitting a message to a network node operative in the wireless communications network. The message comprises a buffer status report comprising the buffer status information. The buffer status report comprises respective indications, for each of the plurality of logical channel groups, of the availability of data to transmit in the terminal device for the logical channel group. The buffer status report further comprises respective buffer size fields, for one or more of the logical channel groups for which data is available to transmit, indicating an amount of data which is available to transmit.

15 Claims, 12 Drawing Sheets

(51) Int. Cl.
    *H04W 72/10*         (2009.01)
    *H04W 72/12*         (2009.01)

(56) References Cited

U.S. PATENT DOCUMENTS

| | | | |
|---|---|---|---|
| 2011/0310937 A1* | 12/2011 | Lin | H04W 28/0278 375/219 |
| 2012/0051255 A1* | 3/2012 | Han | H04W 24/10 370/252 |
| 2015/0359008 A1* | 12/2015 | Wang | H04W 74/0891 370/330 |
| 2017/0099615 A1 | 4/2017 | Tesanovic et al. | |
| 2017/0311310 A1* | 10/2017 | Ryu | H04W 72/0413 |
| 2018/0227938 A1* | 8/2018 | Lee | H04L 5/0053 |
| 2018/0317114 A1* | 11/2018 | Kim | H04L 1/1685 |
| 2020/0015145 A1* | 1/2020 | Wang | H04W 40/22 |
| 2020/0260468 A1* | 8/2020 | Cao | H04W 72/1284 |

OTHER PUBLICATIONS

Unknown, Author, "BSR Formats in NR", 3GPP TSG-RAN WG2 #98-AH, Tdoc R2-1707165, Ericsson, Qingdao, P.R. of China, Jun. 27-29, 2017, 3 pages.

"SR and BSR signalling content in NR", 3GPP TSG-RAN WG2 #97bis; Tdoc R2-1702745; Spokane, USA, Apr. 3-7, 2017, pp. 1-4.

\* cited by examiner

US 11,317,317 B2

METHODS AND APPARATUS RELATING TO BUFFER STATUS REPORTS IN A WIRELESS COMMUNICATION NETWORK

TECHNICAL FIELD

Embodiments of the present disclosure relate to methods and apparatus in a wireless communication network, and particularly to methods and apparatus relating to buffer status reports transmitted from a terminal device to a network node in a wireless communication network.

BACKGROUND

In Long Term Evolution (LTE), resources for uplink (UL) transmissions are granted by a network node. This can be done dynamically, i.e. the network node schedules the UL transmission per transmission time interval (TTI). Alternatively, this can be done using the semi persistent scheduling (SPS) framework, so that multiple periodic TTIs are granted at the same time, i.e. prior to a data transmission. This grant is considered a configured grant so that data transmissions happen according to, for example, the specified resource allocation and modulation and coding scheme (MCS) in subsequent SPS occasions. In LTE Rel-14, the SPS framework is enhanced under the name of 'Instant Uplink Access' or 'Fast Uplink Access' to allow periodicities of one TTI, i.e., such that consecutive TTIs are persistently allocated to a particular terminal device.

When a terminal device makes a new transmission, it must first request that resources are scheduled by a network node. The UE can request resource scheduling, for example, by sending a scheduling request (SR) or a Buffer Status Report (BSR).

Scheduling requests (SRs) are used for requesting uplink shared channel (UL-SCH) resources for new transmissions when the terminal device has no valid grant. If SRs are not configured for the terminal device, the terminal device initiates a Random Access procedure in order to get scheduled in UL. In LTE a SR consists of only one bit of information and indicates only that the terminal device needs a UL grant. This means that upon reception of a SR, the network node does not know which logical channel (associated with a certain QoS Class Identifier) has data available for transmission, nor the amount of data available for transmission at the terminal device.

Buffer Status Reports (BSRs) carry more detailed information compared to SRs. A BSR indicates buffer size (i.e. the amount of data) for each LCG (Logical Channel Group). A BSR is a medium access control (MAC) control element (CE) from a terminal device to the network carrying information on how much data is in the terminal device buffer to be transmitted in the uplink. The network can then allocate an amount of UL Grant (e.g. resources for the physical uplink shared channel, PUSCH), if the resources are available.

The BSR requires a grant of UL resources from the relevant network node, so it may take longer to transmit to the network node, since it may need to be preceded by a SR. An example interaction between SR, BSR and grant is shown in the signaling diagram shown in FIG. 1. Data is received or obtained by a UE (i.e. a terminal device) at 102. The UE then sends a SR 104 to a network node (e.g. an eNB) to request that the network node allocates resources to enable the UE to transmit a BSR. The network node schedules resources and sends an indication of grant at 106. In response to the indication of grant, the UE uses the granted resources to send data and also a BSR indicating an amount of data stored in the UE buffer at 108. The network node schedules appropriate resources, based on the indicated amount of data, and signals a grant of those further resources to the UE at 110. The UE can then use the further resources to send the data at 112.

There are two types of data structure for BSRs according to release 13 of the LTE standard, as shown in FIGS. 2a and 2b.

FIG. 2a shows the data structure for short BSRs 200, comprising a Logical Channel Group ID (LCG ID) field 202 and a buffer size field 204. The gradations indicate the relative number of bits allocated to each field. Thus, two bits are allocated to the LCG ID field 202, and six bits are allocated to the buffer size field 204. Using short BSR, the terminal device can inform the network node about the amount of data in the UE's buffer for one specific LCG only (i.e., the BSR contains one LCG ID field and one corresponding Buffer Size field). Moreover, as the LCG ID field 202 has only two bits, the short BSR can indicate one of only four LCGs configured for the terminal device.

FIG. 2b shows the data structure for long BSRs 206. The long BSR comprises three bytes and four fields 208, 210, 212, 214 allocated to those three bytes (e.g. six bits for each field). Each of the four fields describes the amount of data in the buffer of the UE belonging to a particular LCG, and the order of the fields may be predetermined so that the LCG ID need not be transmitted. In this way, the terminal device can transmit UL buffer information for all four LCGs in one message.

A BSR index (i.e. value) of "0" for a particular field 204, 208, 210, 212, 214 may indicate "no data". As the value gets larger, the field indicates more data to transmit for the associated LCG.

Efforts are on-going to develop and standardize communications networks and protocols intended to meet the requirements set out for the fifth generation (5G) of wireless systems, as defined by the Next Generation Mobile Networks Alliance. Such communication networks and protocols are often referred to as New Radio (NR).

One aspect that has been agreed for the developing NR standard is that the number of logical channel groups should be increased from four to eight. Clearly, changes are required to the BSR formats illustrated in FIGS. 2a and 2b in order to accommodate the additional logical channel groups (as the LCG ID field 202 allows identification of only four different LCGs).

Further, the NR network and standard are expected to support a large number of use cases, with different use cases having widely different requirements in terms of the service provided by the network. Given that NR is intended to be used in a broad range of mixed radio conditions and applications, with data rates ranging from a few kilobits up to many gigabits, using a BSR value range that is too short will in some cases result in inefficient scheduling because the scheduler will only have an approximate understanding of the amount of data that the terminal device needs to transmit for its logical channels.

SUMMARY

Embodiments of the disclosure provide methods and nodes, such as terminal devices and network nodes (e.g. eNodeBs or gNodeBs, or servers coupled to such nodes), that alleviate some or all of the problems identified above.

One aspect of the disclosure provides a method in a terminal device for a wireless communications network. The terminal device is configurable with a plurality of logical channel groups. The method comprises: generating buffer status information; and transmitting a message to a network node operative in the wireless communications network, the message comprising a buffer status report comprising the buffer status information. The buffer status report comprises: respective indications, for each of the plurality of logical channel groups, of the availability of data to transmit in the terminal device for the logical channel group; and respective buffer size fields, for one or more of the logical channel groups for which data is available to transmit, indicating an amount of data which is available to transmit.

A further aspect of the disclosure provides a method in a network node operative in a wireless communications network. The method comprises: receiving a message from a terminal device operative in the wireless communications network, the terminal device being configurable with a plurality of logical channel groups, the message comprising a buffer status report comprising the buffer status information. The buffer status report comprises: respective indications, for each of the plurality of logical channel groups, of the availability of data to transmit in the terminal device for the logical channel group; and respective buffer size fields, for one or more of the logical channel groups for which data is available to transmit, indicating an amount of data which is available to transmit.

Further aspects provide apparatus and machine-readable mediums comprising instructions for performing the methods set out above.

Note that the discussion below focuses on a technical solution for LTE and those networks intended to meet the requirements set out for the fifth generation (5G) of wireless systems, as defined by the Next Generation Mobile Networks Alliance. However, those skilled in the art will appreciate that it is also possible to apply the methods and apparatus described herein to other networks and access technologies. In other networks, nodes and interfaces may have different names.

Further, the description below includes embodiments in which up to eight logical channel groups may be configured concurrently for a terminal device. Those skilled in the art will appreciate, however, that the concepts described herein may be extended to provide BSR reporting for a greater number of concurrent logical channel groups. For example, the size of the plurality of indications may be increased to as to provide indications for more than eight logical channel groups.

Further, the description below describes the grouping of logical channels, with indications of data to transmit and buffer size fields being provided at the level of logical channel groups. Those skilled in the art will appreciate that some networks or network protocols may not provide for grouping of logical channels, and instead may report buffer size fields for logical channels individually. Again, the concepts disclosed below may be utilized in such networks or network protocols, with indications being provided for individual logical channels and buffer size fields being provided for individual logical channels. Some networks or network protocols may utilize BSR reporting for a mix of logical channel groups and individual logical channels. Again, the concepts disclosed below may be utilized in such networks or network protocols, with indications being provided for individual logical channels and logical channel groups, and buffer size fields being provided for individual logical channels and logical channel groups.

BRIEF DESCRIPTION OF THE DRAWINGS

For a better understanding of the present disclosure, and to show how it may be put into effect, reference will now be made, by way of example, to the accompanying drawings, in which.

DETAILED DESCRIPTION

Figure 1:
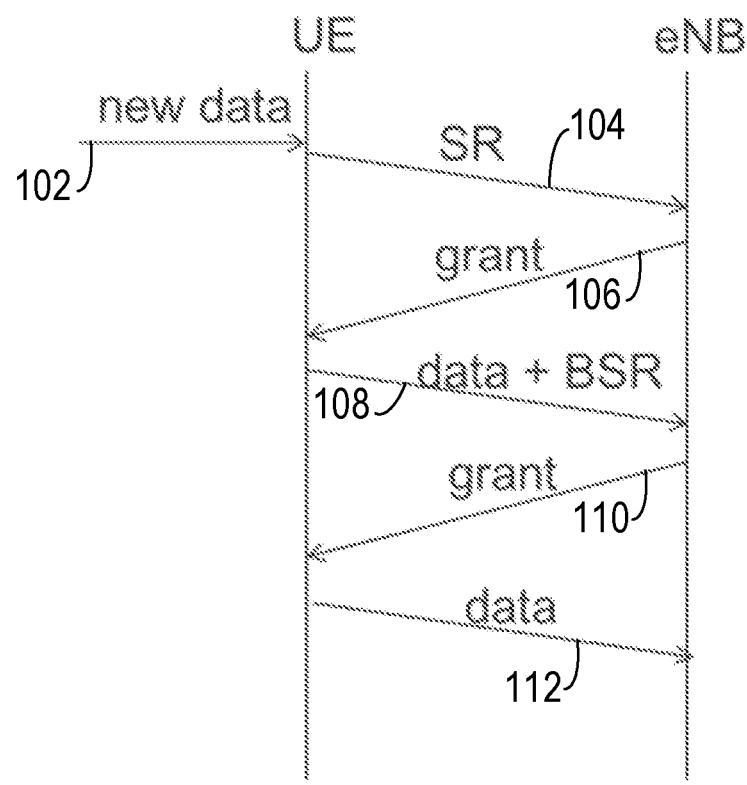
FIG. 1 shows a signalling diagram of a grant procedure for granting uplink resources to a UE.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for a terminal device, or user equipment (UE), it should be understood by the skilled in the art that "UE" is a non-limiting term comprising any mobile or wireless device, terminal or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device", "terminal device" and "wireless terminal device" may be used interchangeably in the following description, and it will be appreciated that such a device does not necessarily have to be 'mobile' in the sense that it is carried by a user. Examples of UE are target device, device to device (D2D) UE, machine type UE or UE capable of machine to machine (M2M) communication, PDA, tablet computer, mobile terminals, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrowband Internet of Things (NB-IoT) UE, UE Cat NB1, etc.

In some embodiments a more general term "network node" is used and it can correspond to any type of radio access node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, test equipment, etc. Moreover, where the following description refers to steps taken in or by a network node or a radio access node, this also includes the possibility that some or all of the processing and/or decision making steps may be performed in a device that is physically separate from the radio antenna of the node, but is logically connected thereto. Thus, where processing and/or decision making is carried out "in the cloud", the relevant processing device is considered to be part of the node for these purposes.

The embodiments are described for LTE or LTE based systems such as machine-type communication (MTC), evolved MTC (eMTC), NB-IoT etc. As an example MTC UE, eMTC UE and NB-IoT UE also called UE category 0, UE category M1 and UE category NB1. However, the embodiments are applicable to any RAT or multi-RAT systems, where the UE receives and/or transmit signals (e.g. data) e.g. LTE FDD/TDD, WCDMA/HSPA, GSM/GERAN, Wi-Fi, WLAN, CDMA2000, 5G, NR, etc. It is recalled that 5G, the fifth generation of mobile telecommunications and wireless technology is not yet fully defined but in an advanced draft stage within 3GPP. It includes work on 5G New Radio (NR) Access Technology. LTE terminology is used in this disclosure in a forward looking sense, to include equivalent 5G entities or functionalities although a different term is specified in 5G. A general description of the agreements on 5G New Radio (NR) Access Technology so far is contained in most recent versions of the 3GPP 38-series Technical Reports.

Figure 3:
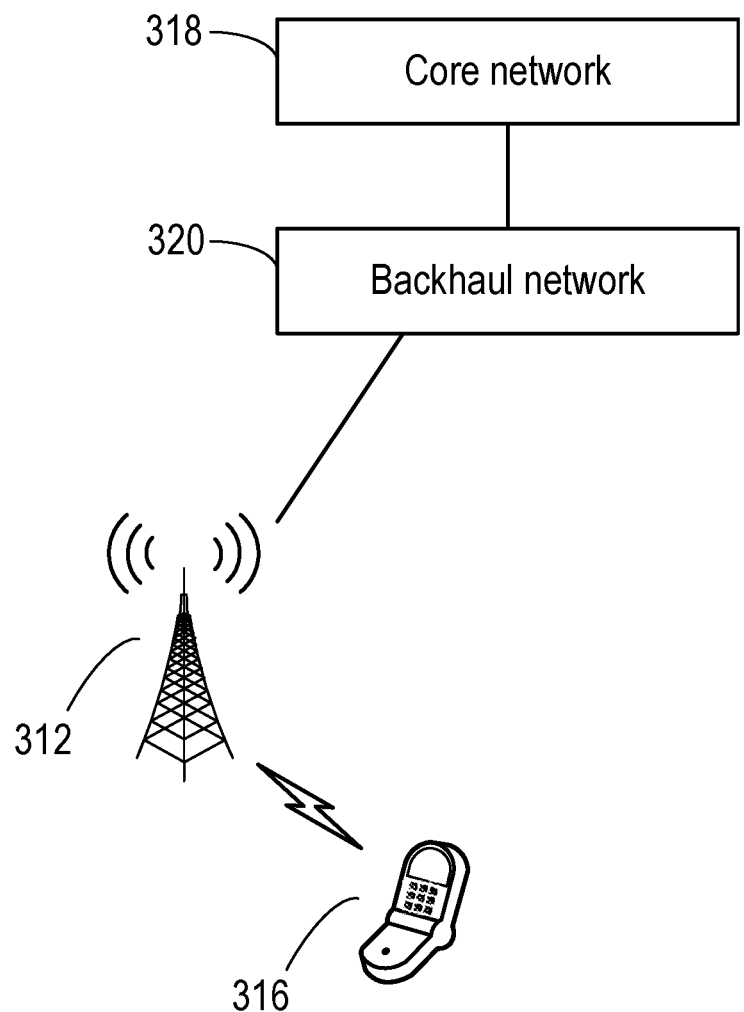
FIG. 3 shows a schematic diagram of a wireless communications network according to embodiments of the disclosure.

FIG. 3 shows a network 310 that may be utilized to explain the principles of embodiments of the present disclosure. The network 310 comprises a network node 312 which is connected, via a backhaul network 320, to a core network 318. FIG. 3 also shows a terminal device (or UE, wireless terminal, etc) 316 that is in wireless communication with a network node 312. Messages transmitted by the terminal device 316 to the network node 312 are said to be transmitted in the "uplink", while messages transmitted by the network node 312 to the terminal device 316 are said to be transmitted in the "downlink".

The data streams, or flows, of the terminal device 316 are mapped to logical channels (LCH) in Layer 2 (e.g. the medium access control or MAC layer), each channel having a Logical Channel Priority (LCP). The UE MAC scheduler schedules transmissions for the logical channels according to their LCPs.

Each of the logical channels may belong to a logical channel group, and the terminal device 312 may be configured with a plurality of such logical channel groups, each comprising one or more logical channels. In one embodiment, the terminal device 312 may be configurable with up to eight logical channel groups concurrently.

Although the terminal device 316 is illustrated as a mobile phone, or smartphone, it will be understood by those skilled in the art that the terminal device may be any device that is configured for communication with the wireless communication network 310, as noted above.

The network node 312 may be of a type referred to as e.g. radio access nodes, base stations, NodeBs, evolved NodeBs (eNB, or eNodeB), gNodeBs, base transceiver stations, Access Point Base Stations, base station routers, Radio Base Stations (RBSs), macro base stations, micro base stations, pico base stations, femto base stations, Home eNodeBs, relays and/or repeaters, beacon devices or any other network node configured for communication with wireless devices over a wireless interface, depending e.g. on the radio access technology and terminology used.

As discussed above, in order to transmit signals to the network node 312, the terminal device 316 needs to be scheduled with radio resources (i.e. frequencies, time slots, orthogonal codes, etc) on which to transmit. One mechanism for requesting such resources is a buffer status report (BSR). A BSR contains an indication of data which is available in the terminal device to transmit.

Figures 4A, 4B:
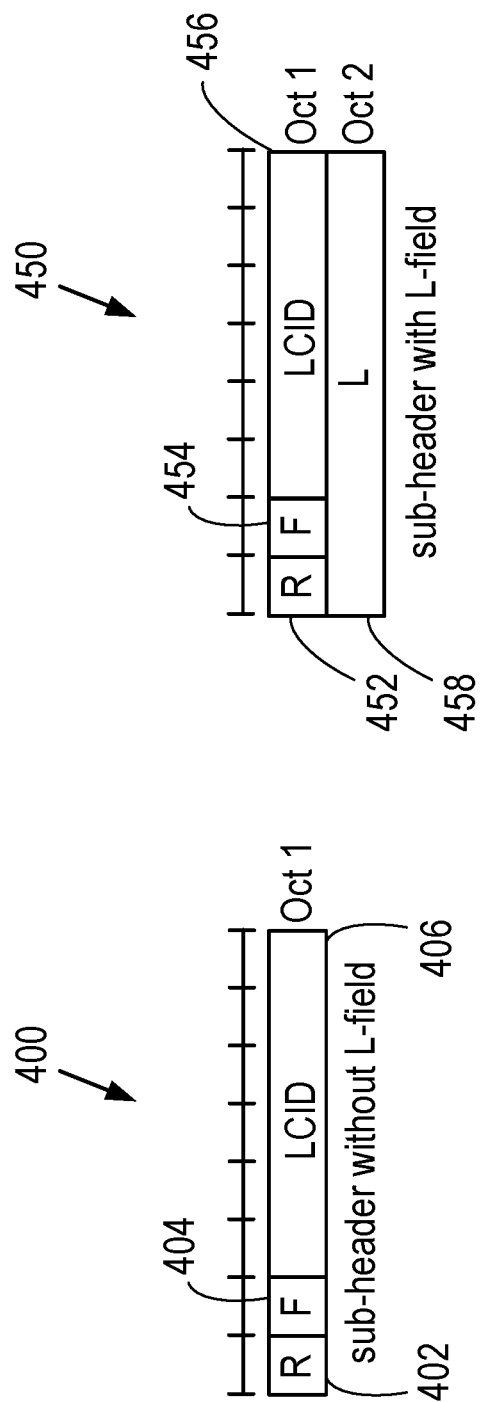
FIGS. 4a and 4b are schematic diagrams of two types of MAC control element sub-header.

As noted above, BSRs are a type of MAC control element (CE). MAC CEs and other MAC service data units (SDUs) may be packaged to form a MAC protocol data unit (PDU). Each MAC CE and MAC SDU may be associated with a corresponding sub-header. FIGS. 4a and 4b show two example sub-header fields for a MAC CE.

FIG. 4a shows a first sub-header 400, comprising a reserved (R) field 402, a format (F) field 404 and a logical channel ID (LCID) field 406. The R field 402 is reserved for a future or additional functions. The F field 404 defines the format of the sub-header, and particularly may indicate the presence or absence of a length field in the sub-header. The F field 404 may also define the length of the L field if present. The LCID field 406 comprises an identifier which defines the function and/or format of the associated control element. For example, by taking one or more certain values, the LCID field 406 can indicate that the associated control element is a BSR.

In the illustration, the R field 402 comprises a single bit; the F field 404 comprises a single bit; and the LCID field 406 comprises six bits. The sub-header 400 thus comprises a single byte.

FIG. 4b shows a second sub-header 450, comprising a reserved (R) field 452, a format (F) field 454, a logical channel ID (LCID) field 456, and a length (L) field 458. The R field 452, the F field 454, and the LCID field 456 have similar functions to their counterparts 402, 404 and 406 respectively. The L field 458 indicates the length of the associated control element. For example, the L field 458 may comprise an indication of the number of bytes of the associated control element.

In the illustration, the R field 452 comprises a single bit; the F field 454 comprises a single bit; the LCID field 456 comprises six bits; and the L field 458 comprises 8 bits.

It will be understood that the fields, their sizes, and their locations in the sub-header are yet to be finalized for NR. For the purposes of the present disclosure, it suffices to describe that at least two sub-header types may be defined: one with a length (L) field, to be used for variable-sized control elements; and one without an L field, to be used for fixed-size control elements.

Figure 2A:
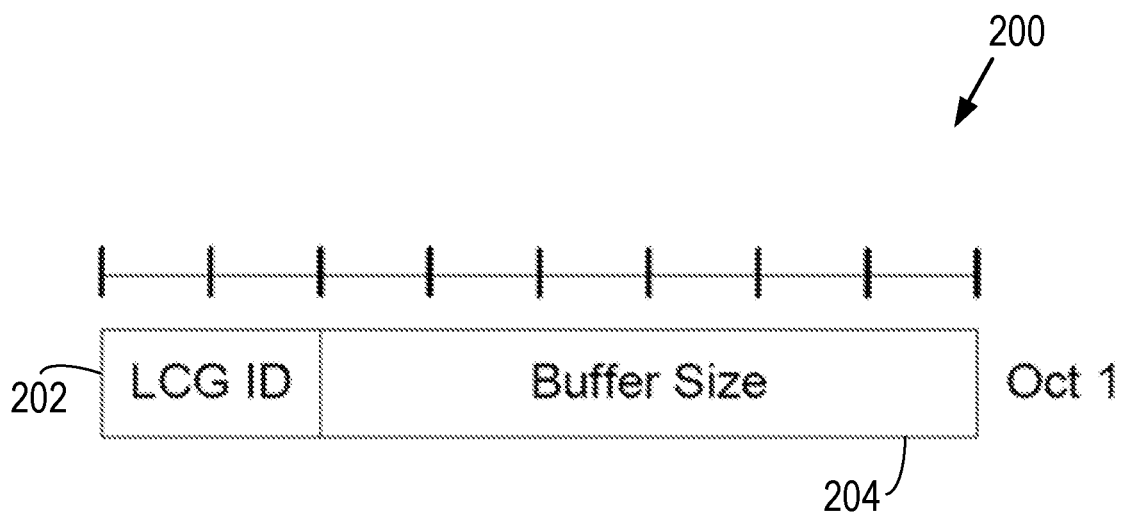
FIG. 2a shows a short format buffer status report.
Figure 2B:
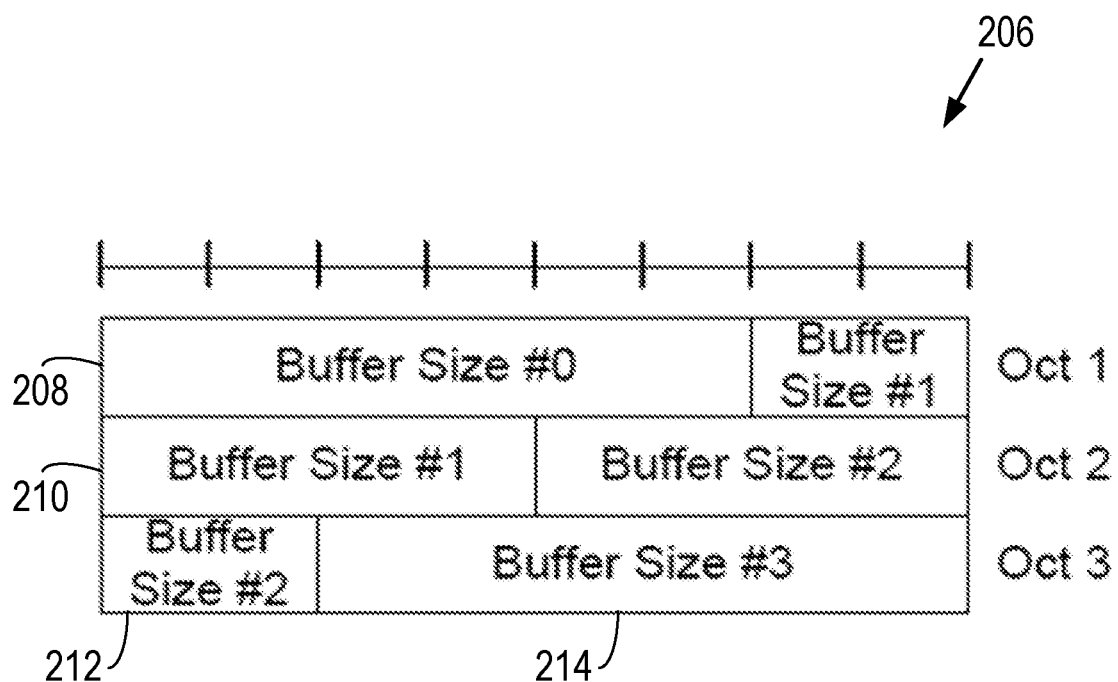
FIG. 2b shows a long format buffer status report.
Figure 5:
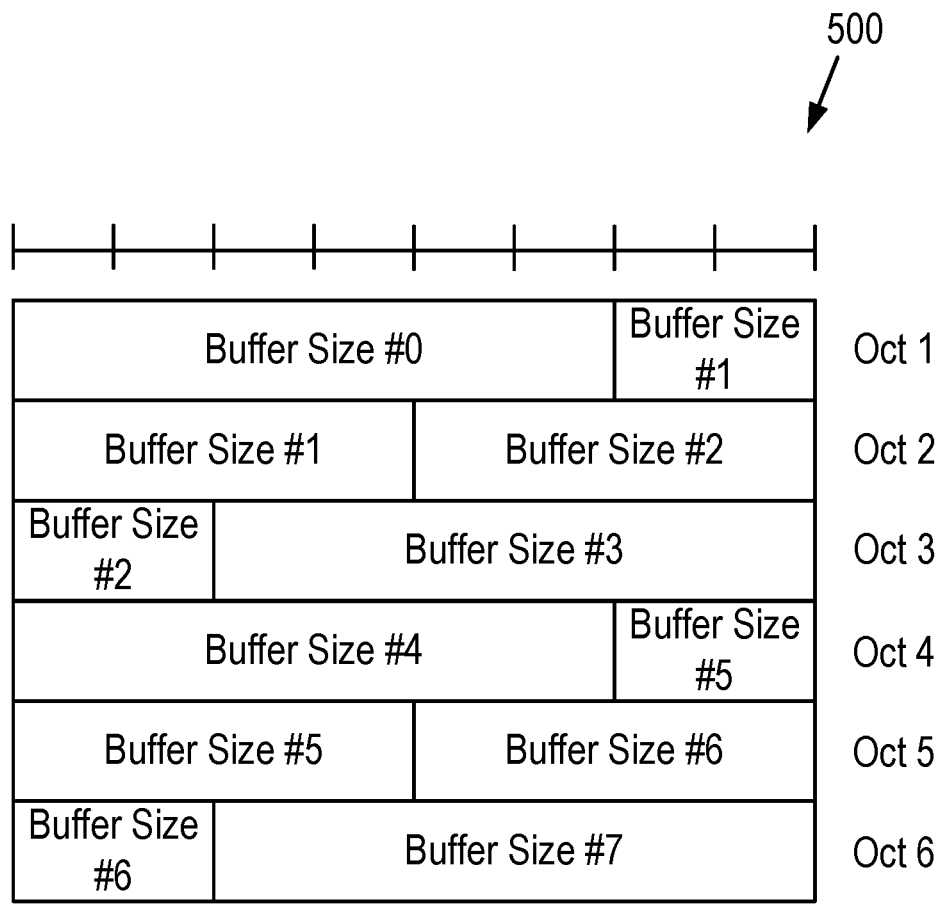
FIG. 5 shows an extended buffer status report.

As noted above, one problem addressed by embodiments of the disclosure relates to the need to adapt the BSR format shown in FIGS. 2a and 2b to cope with more than four logical channel groups. FIG. 5 shows a BSR 500 according to one possible configuration for achieving that adaptation.

The BSR 500 corresponds essentially to the long format BSR shown in FIG. 2b. In order to handle up to eight LCGs, the BSR is twice as big and comprises six bytes. Thus, separate buffer size fields are provided for each of the LCGs, and each buffer size field comprises six bits.

The BSR 500 has a fixed size, and therefore may be associated with the sub-header 400 shown in FIG. 4a. In total, therefore, the size of the BSR plus the sub-header is seven bytes.

The BSR 500 has a number of drawbacks, however. For example, certain buffer size fields may be redundant if the terminal device is configured with fewer than eight LCGs, and therefore resources are wasted.

Further, six bits may be insufficient to convey a buffer status with the granularity required for the wide range of mixed services and radio channel capacities expected to be supported by NR and future communication networks.

Figure 6:
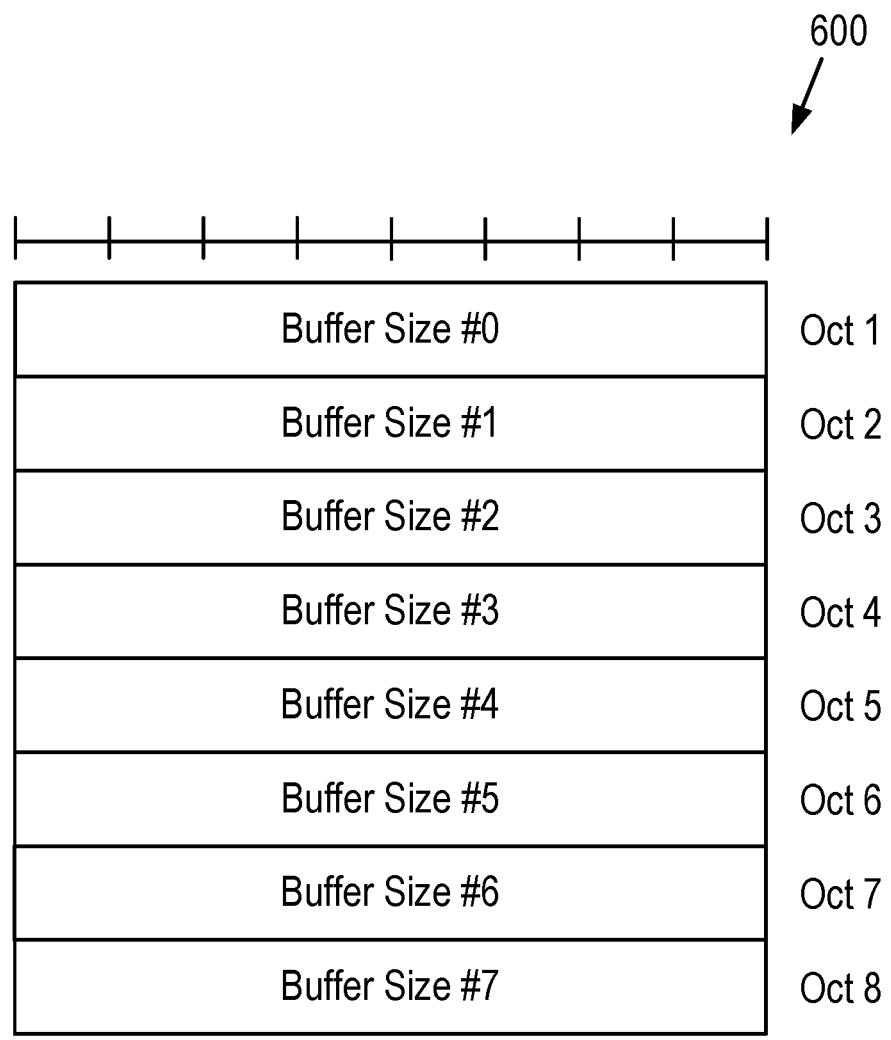
FIG. 6 shows a further extended buffer status report.

FIG. 6 shows a BSR 600 according to a further possible configuration. The BSR 600 corresponds to the BSR 500, but 8 bits (one byte) are provided for each buffer size field. Therefore the granularity of the buffer size reporting is improved, at the cost of further resources required for the transmission of the BSR itself. The BSR 600 has a fixed size, so may be utilized with the sub-header 400 shown above in FIG. 4a. In total, the BSR 600 and the sub-header 400 comprise nine bytes. However, the BSR 600 suffers from the same drawback as BSR 500 in that it will comprise redundant buffer size fields if the terminal device is configured with fewer than eight LCGs.

Figure 7:
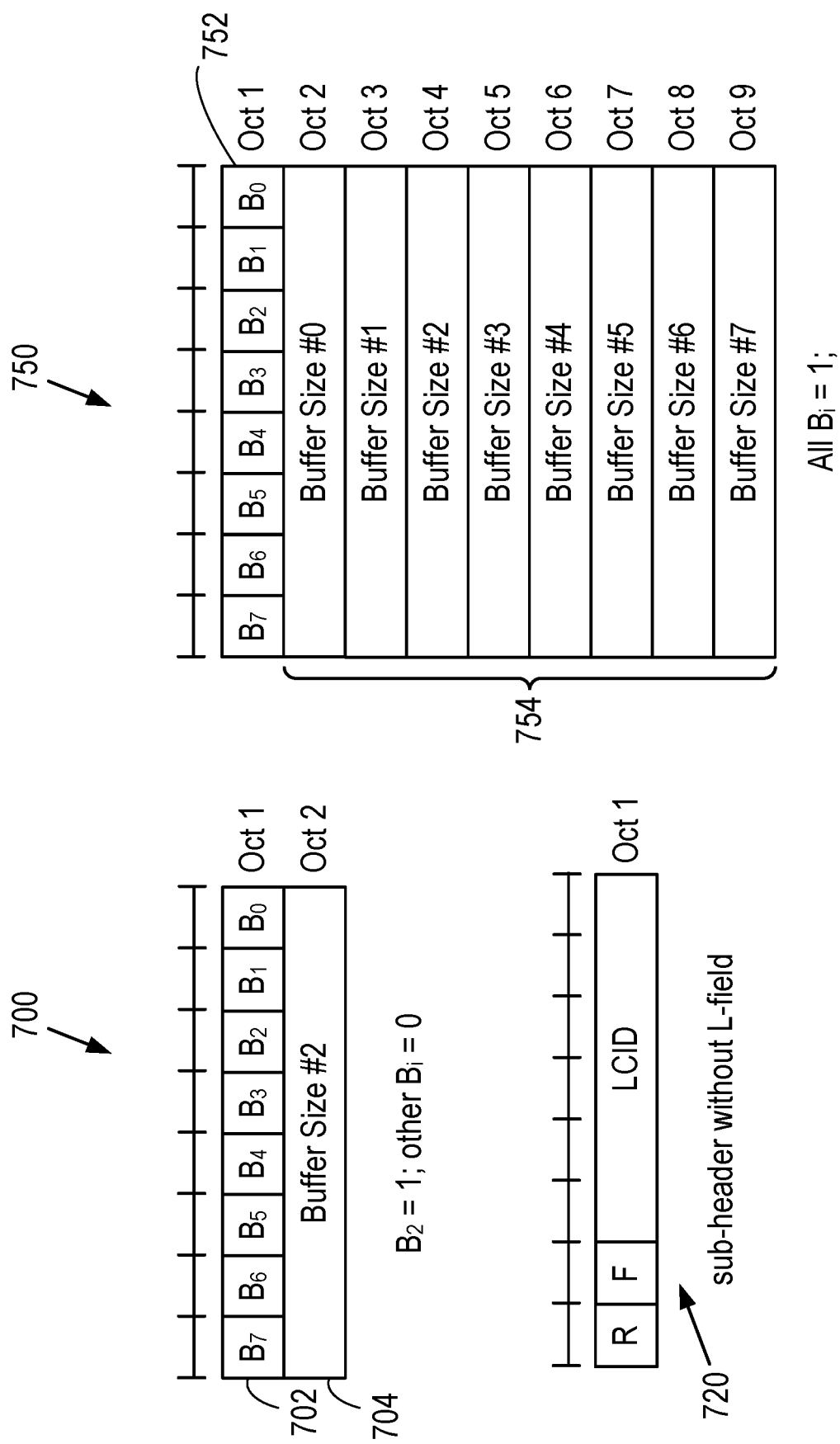
FIG. 7 shows another extended buffer status report.

FIG. 7 shows a BSR 700 according to a further possible configuration.

The BSR 700 comprises a bitmap 702 and one or more buffer size fields 704. In the example of BSR 700, only a single buffer size field is shown. A second BSR 750 is also shown in FIG. 7, configured similarly to BSR 700, comprising a bitmap 752 and eight buffer size fields 754.

The bitmaps 702, 752 comprise respective indications for each of the LCGs, indicating the presence or absence of buffer size fields for the respective LCGs in the BSR. In the example of BSR 700, only bit $B_2$ is asserted (i.e. equal to "1") and all the other bits are unasserted (i.e. equal to "0"). Therefore the BSR 700 contains only a single buffer size field 704 for the LCG associated with bit $B_2$. In the example of BSR 750, each of the bits is asserted, and therefore the BSR 750 comprises respective buffer size fields 754 for each of the LCGs.

The buffer size fields for each of the BSRs 700, 750 may comprise one byte and, as there are up to eight LCGs configured for the terminal device, the bitmaps 702, 752 also comprise one byte.

As the bitmaps 702, 752 comprise indications of the presence or absence of a buffer size field for each of the LCGs, the length of the BSR may be determined by the sum of the bits of the bitmap. For example, as the bitmap 702 comprises only a single "1", it is clear that only a single buffer size field follows and the length of the BSR 700 is two bytes. As the bitmap 752 comprises eight "1"s, eight buffer size fields follow and the length of the BSR 750 is nine bytes.

Thus the BSRs 700, 750 may again be associated with a sub-header 400 as shown in FIG. 4a (and reproduced in FIG. 7 as sub-header 720). No length field is required as the length of the BSR is determined by the sum of the bits in the bitmap. Thus the total size of this solution (i.e. the BSR and the associated sub-header) ranges from two bytes (when there is no data to transmit and the bitmap contains all "0"s) to ten bytes (where there is data to transmit for all eight LCGs).

Therefore the BSRs 700, 750 address the problems of supporting up to eight LCGs, and that no redundant fields are included if the terminal device is configured with fewer than eight LCGs.

However, even the BSRs 700, 750 have some disadvantages in that significant resources are required to transmit them, especially when the terminal device is configured with high numbers of LCGs. Future networks are expected to be lean, using limited resources efficiently, and operate reliably in poor radio conditions.

Figure 8:
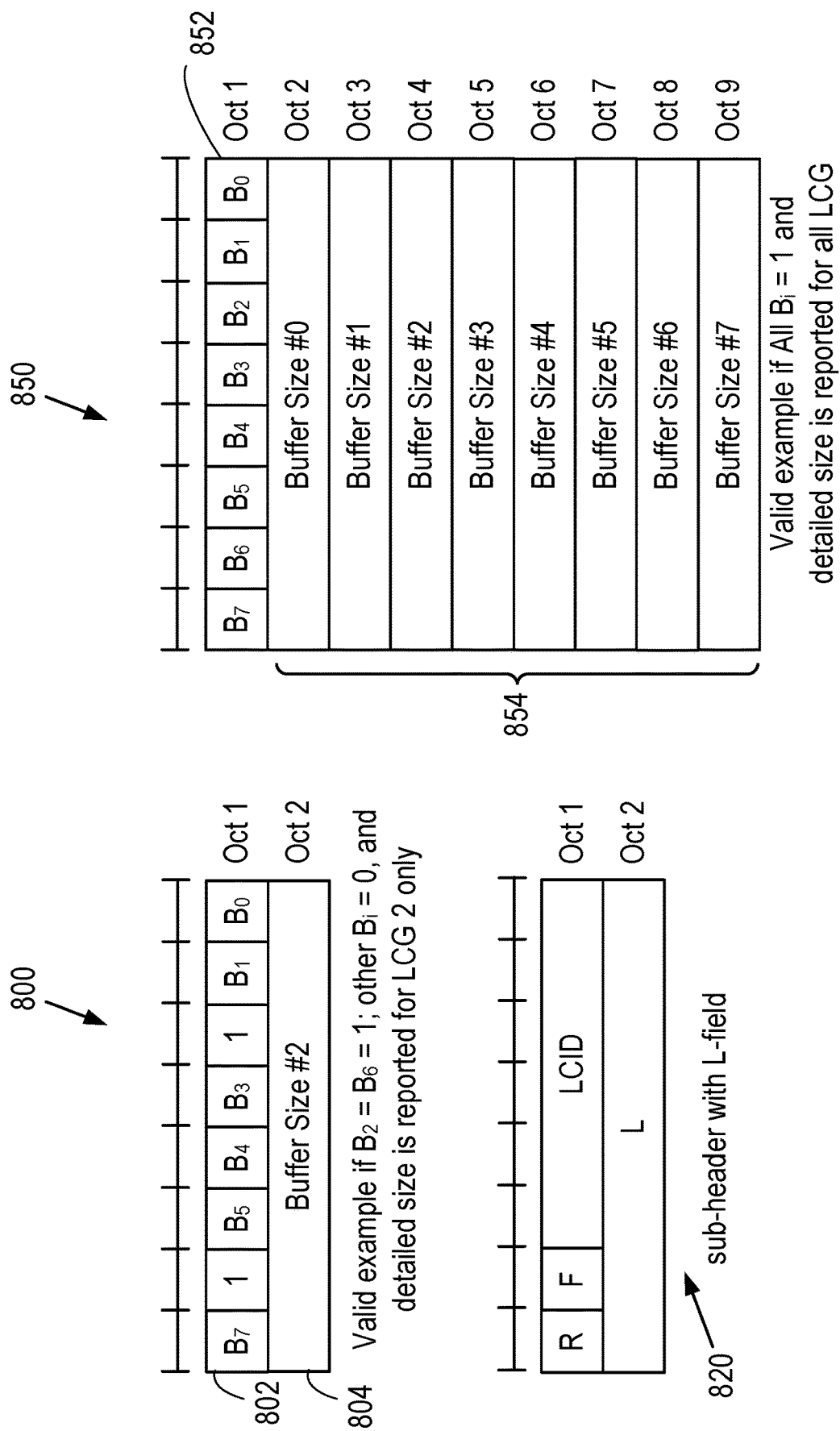
FIG. 8 shows a buffer status report according to embodiments of the disclosure.

FIG. 8 shows a BSR 800 according to embodiments of the disclosure.

The BSR 800 comprises respective indications for each of the plurality of LCGs (i.e. up to eight), indicating whether the terminal device has data available to transmit for the respective LCG. In one embodiment, the respective indications are comprised within a bitmap 802, with each bit of the bitmap 802 corresponding to one LCG. Thus the bitmap 802 may be one byte long. An asserted bit at a particular bit position within the bitmap indicates that the terminal device has data available to transmit for at least one logical channel belonging to the LCG associated with the particular bit position. In other words, the buffer size for the LCG is greater than zero. An unasserted bit at a particular bit position within the bitmap 802 indicates that the terminal device has no data available to transmit for any logical channel belonging to the LCG associated with the particular bit position, or that no LCG is associated with the particular bit position (i.e. where the terminal device is configured with fewer than eight LCGs).

The indications may be arranged according to a particular order, such that the indication for a first LCG occurs before an indication for a second LCG, etc. The order may be configured by signalling from the network (i.e. via dedicated signalling from a radio access node, such as radio resource control (RRC) signalling; or via broadcast signalling from a radio access node, such as system information blocks), or pre-programmed in the terminal device, or determined by the terminal device and signalled to the network node (e.g. via a physical control channel).

The order may be determined according to priority values associated with LCGs or the logical channels belonging to them. For example, those skilled in the art will be familiar with the concept of logical channel priority (LCP), which is the mechanism according to which a MAC scheduler allocates MAC SDUs to MAC PDUs (i.e. allocates data to be transmitted using the available granted resources). Thus, data belonging to a logical channel with a relatively high LCP value is allocated to a MAC PDU before or in preference to data belonging to a logical channel with a relatively low LCP value. In some embodiments, the priority value described herein may be coincident or synonymous with such LCP values, such that the indications are arranged according to such LCP values (hereinafter LCP scheduling values). LCGs associated with relatively high LCP scheduling values may be positioned relatively high in the order (i.e. considered first); LCGs associated with relatively low LCP scheduling values may be positioned relatively low in the order (i.e. considered after one or more of the other LCGs).

In other embodiments, however, the term priority may have a different meaning to that associated with the LCP scheduling values, and thus the priority value may be a dedicated value assigned to each LCG or the logical channels within each LCG for the purposes of determining the order of the indications (i.e. in the bitmap 802). In one such embodiment, the priority value may comprise an indication of the importance that a particular logical channel or LCG be able to report its buffer size accurately. Such priority values are termed BSR priority values hereinafter.

For example, certain logical channels may be associated with small amounts of data, or regular amounts of data. Those logical channels may have a very high LCP scheduling value. For example, it may be important that the data for the logical channel has extremely low latency and therefore that the data be allocated to a MAC PDU for transmission before data for other logical channels. However, if the size of the data for the logical channel is small, or regular and predictable, for example, it is less important that the logical channel be able to report the size of its buffer accurately. In that case, the logical channel may be associated with a relatively low BSR priority value. Similarly, a logical channel may not require low latency and therefore be associated with a relatively low LCP scheduling value. However, the channel may be associated with unpredictable data generation rates, and therefore it is important that the logical channel be able to report its buffer size accurately. The logical channel may therefore be associated with a relatively high BSR priority value.

As noted above, the priority values may be associated with the LCGs themselves, or with the logical channels belonging to the LCGs (or both). In the latter case, the logical channel priority values may be used to determine the order of the indications in the bitmap 802 in a number of different ways. For example, the LCG may be associated with an average priority value for all of the logical channels belonging to it. Alternatively, the LCG may be associated with the highest priority value of all logical channels belonging to it. The present disclosure is not limited in that respect.

Note that the priority values associated with LCGs may be implicit. For example, the LCGs may be allocated to LCG ID numbers according to their priority values, and the order of the indications determined based on the LCG ID numbers.

In the illustrated embodiment, the bitmap information is ordered as $B_0$ to $B_7$, from least-significant bit (LSB) to most-significant bit (MSB), with the highest-priority LCG associated with $B_0$ and the lowest priority LCG associated with $B_7$. Those skilled in the art will appreciate that alternative arrangements of bits may be utilized without departing from the scope of the statements appended hereto.

The BSR 800 further comprises zero or more buffer size fields 804, for those LCGs indicated in the bitmap 802. Each buffer size field may comprise a single byte, and an indication of the amount of data that is available to transmit for the associated logical channel group. However, it will be recalled that the indications in the bitmap 802 indicate that the respective LCGs have (or do not have) data available to transmit. The indications do not necessarily indicate that a corresponding buffer size field 804 is present for the LCG, and thus the BSR 800 may comprise fewer buffer size fields 804 than positive indications in the bitmap 802.

The BSR 800 has a variable size, and is therefore associated with a sub-header 820 which comprises an L field (and corresponds to the sub-header 450 described above). As noted above, the L field indicates the length of the BSR 800. Thus, according to embodiments of the disclosure, the sub-header may be used to indicate the length of the BSR 800 rather than the bitmap 802 (as in FIG. 7). For example, the length field may indicate the number of bytes occupied by the BSR 800, or use some other unit of measurement.

The length field of the BSR 800 may be determined by the terminal device at least in part based on the resources available to the terminal device for transmission of the BSR. For example, it will be recalled from FIG. 1 that a terminal device may transmit a scheduling request 104 to the radio access node if it is not configured with any UL grant of resources. The scheduling request may comprise a single bit, and have no indication of the amount of data that is available to transmit. Thus the radio access node may grant only limited resources (in grant 106) using which the terminal device can transmit a BSR and perhaps some small amount of data.

Thus the resources available to the terminal device for transmission of the BSR may be limited, and in practice this may set a maximum length (i.e. a maximum number of bytes) that the BSR can occupy. According to one embodiment, if the maximum length is such that a BSR can be generated with buffer size fields for all LCGs with data available to transmit, without exceeding the maximum length, the BSR may be generated with buffer size fields for all LCGs with data available to transmit. However, if the maximum length is such that the BSR cannot contain buffer size fields for all LCGs with data available to transmit without exceeding the maximum length, then one or more buffer size fields may be omitted.

Thus the BSR may contain buffer size fields for only a subset of those LCGs with data available to transmit. In one embodiment, the subset of LCGs may be chosen such that buffer size fields are included for the one or more LCGs (which have data available to transmit) associated with the highest priority value or values. The one or more LCGs (which have data available to transmit) associated with the lowest priority value or values may be omitted.

In the example of FIG. 8 and BSR 800, the bitmap comprises positive indications (i.e. asserted bits) for $B_2$ and $B_6$, and negative indications (i.e. unasserted bits) for all other bit positions. The length field of the sub-header indicates that the BSR 800 has a length of two bytes. Therefore the BSR 800 comprises only a single buffer size field 804, for the LCG associated with bit $B_2$. The LCG associated with bit $B_6$ has no associated buffer size field, as it has a lower priority value than the LCG associated with bit $B_2$.

FIG. 8 shows a further example BSR 850, comprising a bitmap 852 and buffer size fields 854. In this example, all bits of the bitmap are asserted. Moreover, the length field of the associated sub-header indicates that the BSR 850 has a length of nine bytes. Thus the BSR 850 comprises respective buffer size fields for each of the LCGs.

It will be noted that, in some scenarios, the terminal device may have no data to report and thus the BSR may contain no buffer size fields. Further, the bitmap will contain only zeroes, and hence the total size of the BSR will be one byte, and together with the sub-header, the total size will be three bytes. In one embodiment, the number of bytes may be reduced by setting the L-field to the value "0" (i.e., allowing a length field of 0) and thus allowing the bitmap to be excluded. Thus, when the terminal device had no data to transmit, the BSR solution would occupy only two bytes (i.e. for the sub-header). Such a BSR may be used as a padding BSR, i.e. a BSR that provides an instant indication to a network scheduler that the terminal device has no data to transmit, and hence no longer needs to be scheduled.

If there is data available to transmit for one logical channel group the total size will be four bytes, and so on. If we compare this with the size of a short BSR used in LTE (i.e. as shown in FIG. 2a), the proposed format will be one or two bytes larger than the current format. However, the proposed format supports up to eight logical channel groups, more granular BSR values with 8-bit lengths are supported, the network node is informed about all logical channel groups for which the terminal device has data to send (as well as a need to send), and the format is unified and can be extended to include BSR data reporting for up to all eight logical channel groups. Moreover, this solution comes with the extra advantage that it may carry explicit information of the presence of data available and the need to transmit. This can be used generally in situations with limited radio capacity, e.g. to make the network aware of data available for transmission e.g. at a situation moving out from one radio-access technology coverage (e.g. NR) and into another radio-access technology coverage (e.g. LTE). It can also be used to implement a simplified scheduler, which may agnostically grant resources if any data is present for a LCG including some critical logical channel.

Figure 9:
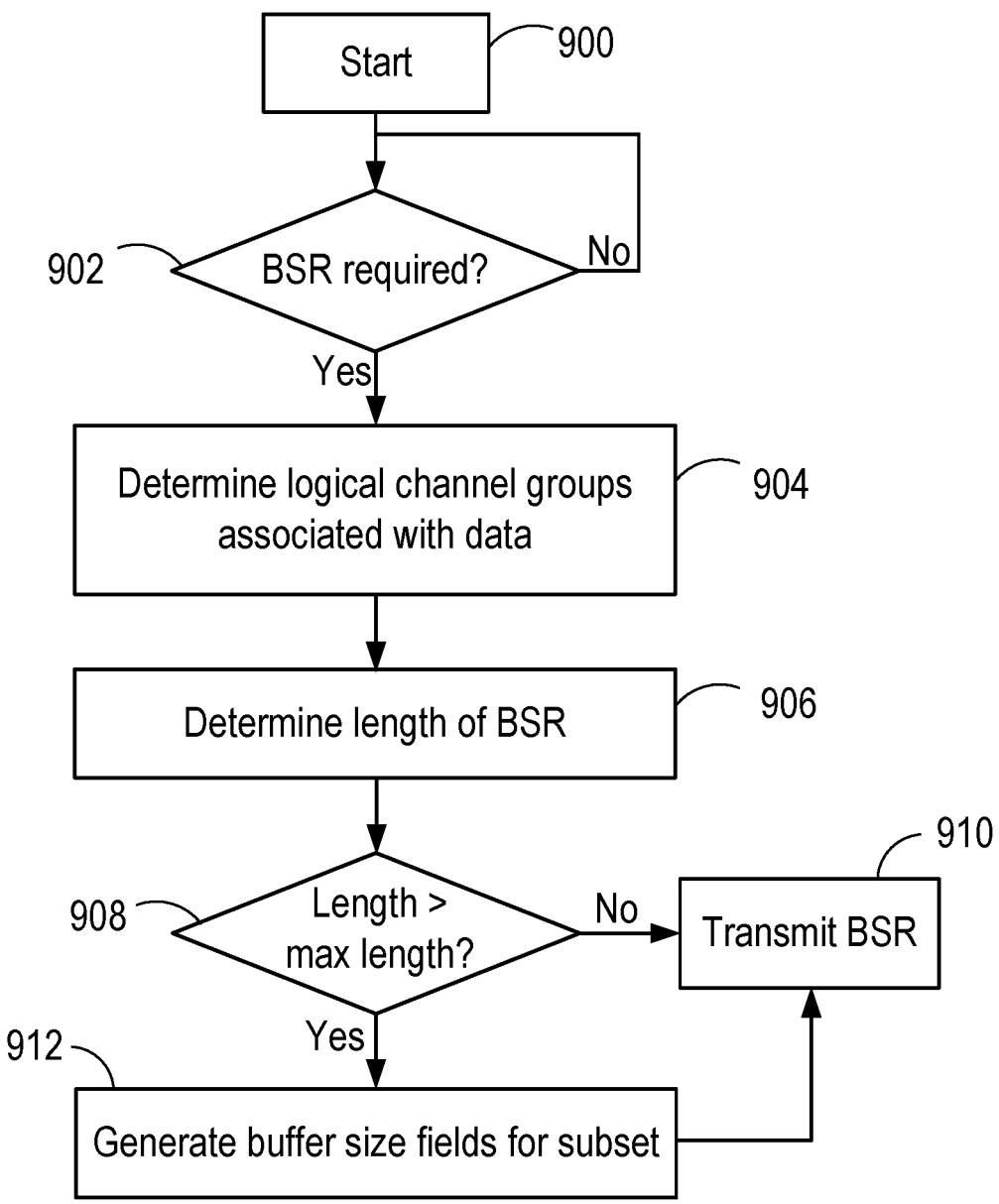
FIG. 9 is a flowchart of a method in a terminal device according to embodiments of the disclosure.

FIG. 9 is a flowchart of a method according to embodiments of the disclosure. The method may be carried out in a terminal device, such as the terminal device 316, for example.

The method begins in step 900. In step 902, the terminal device determines whether transmission of a buffer status report (BSR) is required. Those skilled in the art will appreciate that BSRs may be transmitted in a variety of different circumstances and for a variety of different reasons. In one scenario, the terminal device may determine that transmission of a BSR is required upon determining that it has data available to transmit. For example, the terminal device may determine the presence of data in its buffer. The BSR may be required following transmission of a scheduling request and receipt of a limited grant of UL resources (i.e. as shown in FIG. 1).

Alternatively, BSRs may be transmitted regularly (i.e. at defined intervals), or upon request from a network node. Thus step 902 may comprise the terminal device determining that a BSR is required at a BSR transmission instance (i.e. one of the defined regular BSR transmission time slots), or upon receipt of a suitable request or command from a network node (such as the node 312). In these circumstances it may be determined that a BSR should be transmitted even in the absence of any data available to transmit.

If a BSR is not required, in the illustrated embodiment the method repeats step 902 until a positive determination is made.

If a BSR is required, the method proceeds to step 904 and generates buffer status information for transmission as a buffer status report (BSR).

As noted above, the data streams or flows, of the terminal device are mapped to logical channels (LCH) in Layer 2 (e.g. the medium access control or MAC layer). Each logical channel may belong to a logical channel group (LCG), and the terminal device may be configured with a plurality of such LCGs, each comprising one or more logical channels. In one embodiment, the terminal device is configurable with up to eight LCGs.

In step 904, the terminal device determines the logical channels or logical channel groups associated with any data which is available to transmit. For example, the terminal device may comprise a plurality of buffers, with each buffer storing data which is available to transmit for a particular logical channel or logical channel group. Thus the terminal device may determine the presence of data in each of the plurality of buffers and so identify the logical channels or LCGs with data available to transmit. It will be apparent that in some embodiments, no data may be available for transmission (i.e. for any LCG).

In step 906, the terminal device determines the length of the BSR, assuming that a buffer size field is included for each LCG with data available to transmit. The determination in step 906 may utilize the configured sizes of the buffer size fields (e.g. one byte) and the indications of the presence or absence of data (e.g. one byte). Thus, using those example sizes, if five LCGs have data available to transmit, the BSR length determined in step 906 will be six bytes.

In step 908, the terminal device determines whether the length calculated in step 906 exceeds a maximum length for the BSR transmission.

As noted above, the terminal device may be granted only limited resources (e.g. in grant 106) with which to transmit a BSR and perhaps some small amount of data, and this may set a maximum length (e.g. a maximum number of bytes) that the BSR can occupy. Alternatively, the terminal device may be configured with a maximum length, e.g. through signalling from a network node (e.g. via dedicated signalling, such as RRC signalling; or via broadcast signalling, such as system information). For example, the terminal device may be configured to transmit a BSR comprising only an indication of the availability of data to transmit (i.e. no buffer size fields).

If the length calculated in step 906 does not exceed the maximum length (i.e. is the same as or less than the maximum length), a BSR is generated comprising buffer size fields for all LCGs with data available to transmit. The method proceeds to step 910, and the BSR is transmitted to a network node (e.g. the network node 312). It will be noted that the BSR may take a format as described above with respect to FIG. 8 (i.e. comprising a plurality of indications of the presence/absence of data to transmit, etc).

If the length calculated in step 906 exceeds the maximum length, the method proceeds to step 912. In step 912, the terminal device generates buffer size fields for only a subset of the LCGs for which data is available to transmit. The number of LCGs for which buffer size fields are included (i.e. the number of LCGs in the subset) may be chosen such that the BSR has the maximum number of buffer size fields without exceeding the maximum length. For example, the number of LCGs for which buffer size fields are included (i.e. the number of LCGs in the subset) may be chosen such that the BSR has a length equal to the maximum length.

As noted above, the LCGs and/or the logical channels themselves may be associated with respective priority values (e.g. an LCP scheduling value, or a BSR priority value). In one embodiment, the subset of LCGs may be chosen such that buffer size fields are included for the one or more LCGs (which have data available to transmit) associated with the highest priority value or values. The one or more LCGs (which have data available to transmit) associated with the lowest priority value or values may be omitted.

The method proceeds to step 910 and the BSR (with the reduced number of buffer size fields) is transmitted to the network node. It will be noted that the BSR may take a format as described above with respect to FIG. 8 (i.e. comprising a plurality of indications of the presence/absence of data to transmit, etc).

In an alternative embodiment to that which is illustrated in FIG. 9, step 912 may comprise reducing the number of buffer size fields by one (or some other decrement). Once step 912 is complete, rather than proceeding to step 910, the method may repeat step 908, when the new, reduced length is compared to the maximum length. Steps 908 and 912 may repeat until a determination in step 908 that the length of the BSR has been reduced until it no longer exceeds the maximum length. At that point, the method moves from step 908 to step 910.

Figure 10:
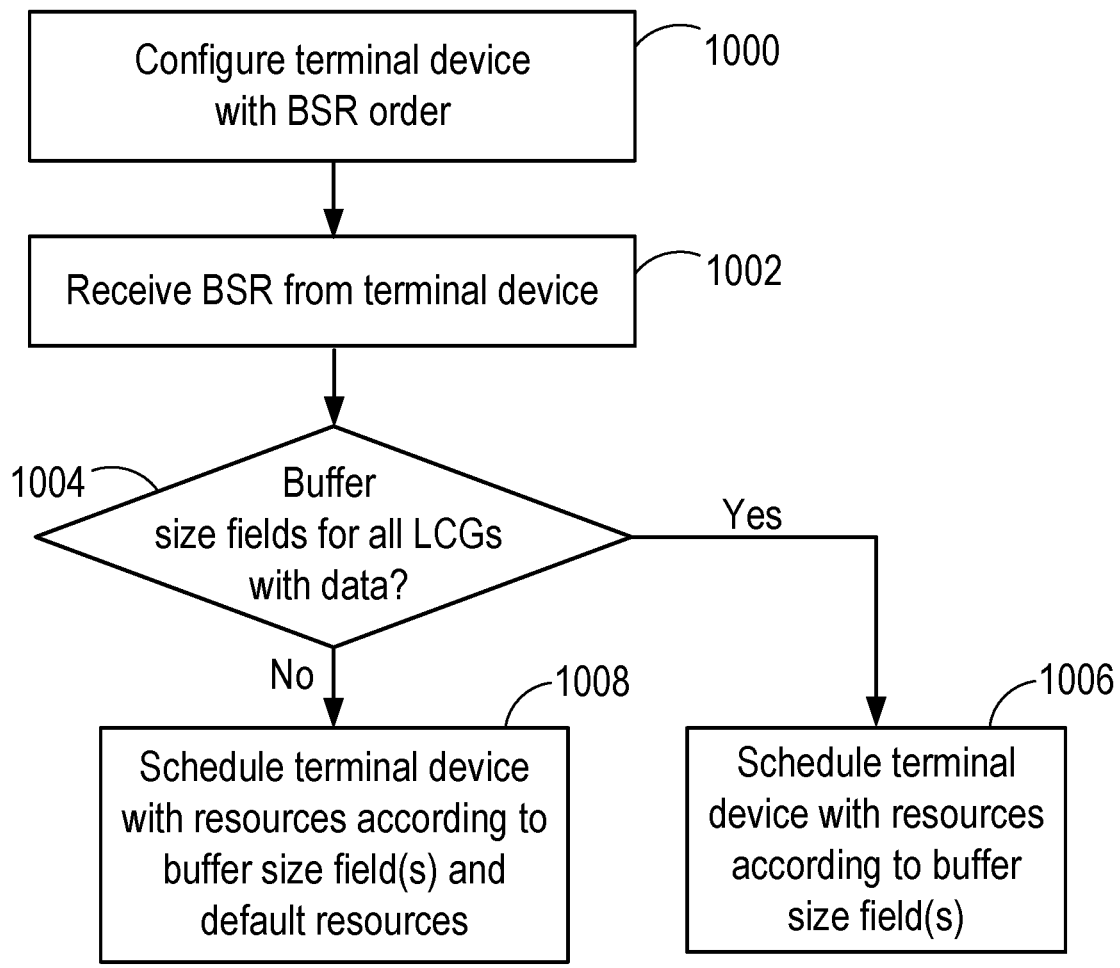
FIG. 10 is a flowchart of a method in a network node according to embodiments of the disclosure.

FIG. 10 is a flowchart of a method according to embodiments of the disclosure. The method may be carried out in a network node of the wireless communications network, such as the network node 312. The network node may be a radio access network node, or a network node that is coupled to the radio access network node and operable to control the radio access network node remotely (e.g. from the cloud).

The method begins in step 1000, in which the network node optionally configures a terminal device with a BSR reporting order.

As noted above, the data streams or flows, of the terminal device are mapped to logical channels (LCH) in Layer 2 (e.g. the medium access control or MAC layer). Each logical channel may belong to a logical channel group (LCG), and the terminal device may be configured with a plurality of such LCGs, each comprising one or more logical channels. In one embodiment, the terminal device is configurable with up to eight LCGs concurrently.

In step 1000, the network node configures the terminal device with an order in which the buffer sizes for the LCGs should be reported (i.e. as described above with respect to FIG. 8). The order may be based on a priority value, such as the LCP scheduling values, or a dedicated priority value, such as the BSR priority value defined above. In some embodiments, the priority value may be implicit, with the LCG IDs allocated to LCGs based on their priority values.

The order may be configured explicitly or implicitly. In the latter case, the network node may configure the terminal device with a reporting order by providing the priority values or LCG IDs referred to above, and allowing the terminal device to determine the order based on the priority values or LCG IDs (so as to arrange the order for ascending or descending priority values of LCG IDs, for example).

The configuration of the order may be signalled to the terminal device, through dedicated signalling (e.g. RRC signalling) or broadcast signalling (e.g. system information broadcast).

In step 1002, the network node receives a BSR from the terminal device. The BSR may take a format as described above with respect to FIG. 8. For example, the BSR may comprise a plurality of indications, each indication indicating whether a respective logical channel or logical channel group has data available to transmit. The plurality of indications may comprise a bitmap, with respective bits indicating whether a corresponding logical channel or logical channel group has data available to transmit. The plurality of indications may be arranged at the start of the BSR.

The BSR may comprise zero or more buffer size fields, with each buffer size field indicating an amount of data available to transmit for one of the logical channels or logical channel groups indicated as having data available to transmit. Each buffer size field may comprise one byte.

The BSR may further comprise or be associated with an indication of the length of the BSR. For example, in one embodiment the BSR may comprise a MAC control element associated with a MAC sub-header. The sub-header may comprise a field indicating the length (e.g. the number of bytes) of the corresponding MAC control element.

In step 1004, the network node determines, based on the plurality of indications and the length, whether the BSR comprises buffer size fields for all of the logical channels or LCGs with data available to transmit. In making the determination, the network node may take into account the known or configured sizes of the plurality of indications (which may be one byte long) and the buffer size fields (which may be one byte long). Thus, if the length of the BSR is indicated as being equal to n bytes (for example, where n is a positive integer equal to or greater than zero), but the plurality of indications contain positive indications for at least n logical channels or logical channel groups, the network node will know that there is no buffer size field for at least one of the logical channels or logical channel groups for which data is available to transmit as the plurality of indications occupy one byte.

If buffer size fields are provided for all logical channels or logical channel groups, the method proceeds to step 1006, in which the network node schedules the terminal device with resources based on the values in the buffer size fields. The scheduling may also take into account other parameters, such as traffic load at the network node. In some circumstances, however, the scheduling may be automatic and grant sufficient resources for the terminal device to transmit the amount of data indicated in the buffer size fields. The grant of uplink resources may be indicated by a transmission via a downlink control channel, for example.

If buffer size fields are not provided for all logical channels or logical channel groups, the method proceeds to step 1008. In step 1008, the network node may again schedule resources for the terminal device according to the values indicated in the buffer size fields (if any). Again, the scheduling may take into account other parameters, such as traffic load, etc, or may be automatic.

However, the network node is also aware that data is available to transmit for one or more logical channels or logical channel groups, without being aware of how much data is available to transmit. In such circumstances, the network node may schedule the terminal device (in addition to any resources for the logical channels or logical channel groups for which buffer size fields are provided) with one or more default sets or amounts of resources, for the transmission of data belonging to the logical channels or logical channel groups for which no buffer size field is provided. The default sets or amounts of resources may be generic, i.e. defined for the whole network, or for the whole cell served by the network node. Alternatively, the default sets or amounts of resources may be specific to the logical channels or logical channel groups for which no buffer size field is provided. The default sets or amounts of resources may be specific to the terminal device.

By virtue of the BSR format described above, and particularly the arrangement of the bits and buffer size fields in a particular order, it is less important that logical channels or logical channel groups for which no buffer size field is provided to report their buffer size accurately. These logical channels or logical channel groups may be associated with regular-sized data transmissions, and the network node may configure the default sets or amounts of resources so as to provide sufficient resources for transmission of the regular amount of data transmitted for the logical channels or logical channel groups.

Figure 11:
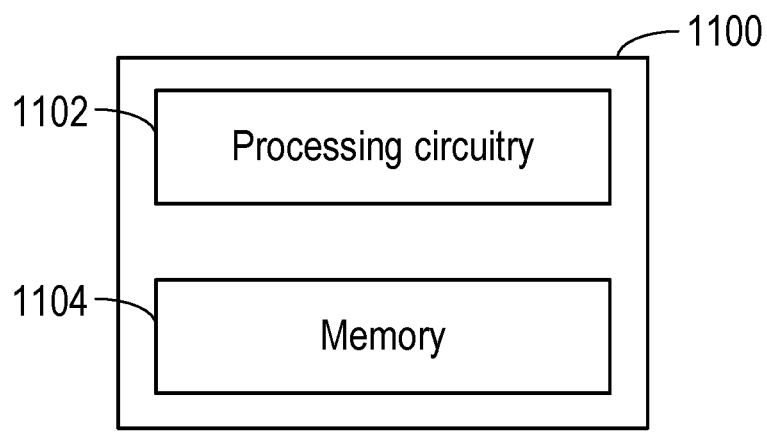
FIG. 11 is a schematic diagram of a terminal device according to embodiments of the disclosure.

FIG. 11 is a schematic diagram of a terminal device 1100 according to embodiments of the disclosure. For example, the terminal device 1100 may correspond to the terminal device 316 described above. The terminal device 1100 may be suitable for performing the method described above with respect to FIG. 9.

The terminal device 1100 comprises processing circuitry 1102 and a non-transitory machine-readable medium 1104 storing instructions which may be executed by the processing circuitry 1102. The terminal device 1100 is configurable with a plurality of logical channel groups.

When executed by the processing circuitry 1102, the instructions cause the terminal device 1100 to: generate buffer status information; and transmit a message to a network node operative in the wireless communications network, the message comprising a buffer status report comprising the buffer status information. The buffer status report comprises: respective indications, for each of the plurality of logical channel groups, of the availability of data to transmit in the terminal device for the logical channel group; and respective buffer size fields, for one or more of the logical channel groups for which data is available to transmit, indicating an amount of data which is available to transmit.

The terminal device 1100 may also generally comprise hardware and/or software for transmitting and receiving wireless signals, such as one or more antennas, and transceiver circuitry coupled to the one or more antennas.

Figure 12:
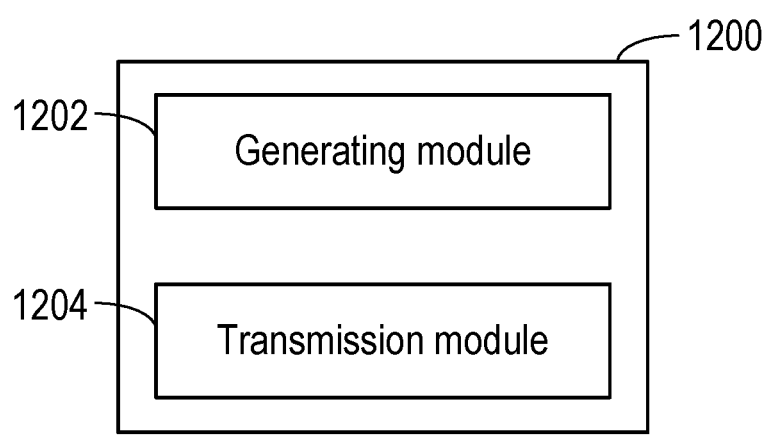
FIG. 12 is a schematic diagram of a terminal device according to further embodiments of the disclosure.

FIG. 12 is a schematic diagram of a terminal device 1200 according to further embodiments of the disclosure. For example, the terminal device 1200 may correspond to the terminal device 316 described above. The terminal device 1200 may be suitable for performing the method described above with respect to FIG. 9.

The terminal device comprises a generating module 1202 and a transmitting module 1204. The terminal device is configurable with a plurality of logical channel groups. The generating module 1202 is configured to generate buffer status information. The transmitting module 1204 is configured to transmit a message to a network node operative in the wireless communications network, the message comprising a buffer status report comprising the buffer status information. The buffer status report comprises: respective indications, for each of the plurality of logical channel groups, of the availability of data to transmit in the terminal device for the logical channel group; and respective buffer size fields, for one or more of the logical channel groups for which data is available to transmit, indicating an amount of data which is available to transmit.

The terminal device 1200 may also generally comprise hardware and/or modules for transmitting and receiving wireless signals, such as one or more antennas, and transceiver modules coupled to the one or more antennas.

Figure 13:
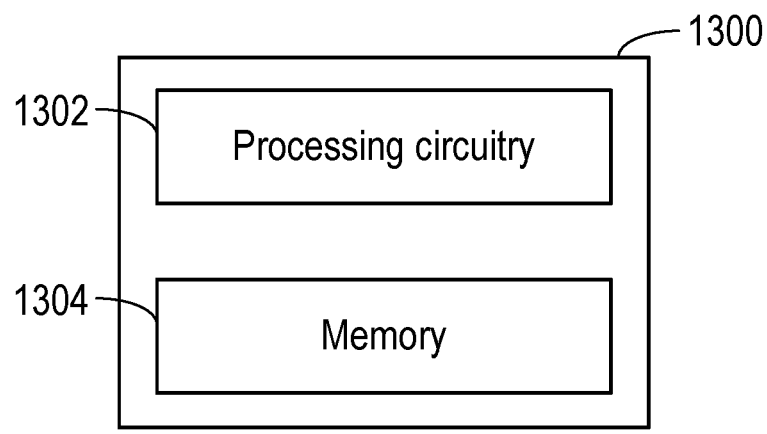
FIG. 13 is a schematic diagram of a network node according to embodiments of the disclosure.

FIG. 13 is a schematic diagram of a network node 1300 according to embodiments of the disclosure. For example, the network node 1300 may be a radio access network node, such as the network node 312 as described above. Alternatively, the network node may be communicatively coupled to such a radio access network node. The node 1300 may be suitable for performing the method described above with respect to FIG. 9.

The node 1300 comprises processing circuitry 1302 and a non-transitory machine-readable medium 1304 storing instructions which may be executed by the processing circuitry 1302.

When executed by the processing circuitry 1302, the instructions cause the network node 1300 to receive a message from a terminal device operative in the wireless communications network, the terminal device being configurable with a plurality of logical channel groups, the message comprising a buffer status report comprising the buffer status information. The buffer status report comprises: respective indications, for each of the plurality of logical channel groups, of the availability of data to transmit in the terminal device for the logical channel group; and respective buffer size fields, for one or more of the logical channel groups for which data is available to transmit, indicating an amount of data which is available to transmit.

The node 1300 may also generally comprise hardware and/or software for transmitting and receiving wireless signals, such as one or more antennas, and transceiver circuitry coupled to the one or more antennas.

Figure 14:
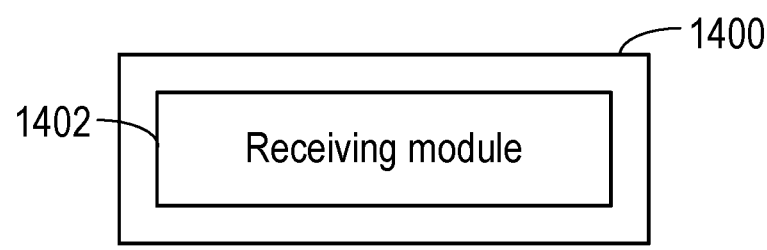
FIG. 14 is a schematic diagram of a network node according to further embodiments of the disclosure.

FIG. 14 is a schematic diagram of a network node 1400 according to embodiments of the disclosure. For example, the network node 1400 may be a radio access network node, such as the network node 312 as described above. Alternatively, the network node may be communicatively coupled to such a radio access network node. The node 1400 may be suitable for performing the method described above with respect to FIG. 9.

The network node 1400 comprises a receiving module 1404, configured to receive a message from a terminal device operative in the wireless communications network, the terminal device being configurable with a plurality of logical channel groups, the message comprising a buffer status report comprising the buffer status information. The buffer status report comprises: respective indications, for each of the plurality of logical channel groups, of the availability of data to transmit in the terminal device for the logical channel group; and respective buffer size fields, for one or more of the logical channel groups for which data is available to transmit, indicating an amount of data which is available to transmit.

The node 1400 may also generally comprise hardware and/or modules for transmitting and receiving signals, such as one or more antennas, and transceiver modules coupled to the one or more antennas for transmitting and receiving wireless signals, and optical and/or electrical circuitry for transmitting and receiving optical and/or electrical signals.

Thus as described above, embodiments of the disclosure provide methods and apparatuses to transmit and receive buffer status reports. The buffer status reports are configurable to provide information on data which is available to transmit for a large number of logical channel groups. In embodiments of the disclosure, the buffer status reports utilize relatively few resources, and particularly the size of the buffer status report may be adapted according to the resources available for transmission of the buffer status report.

It will be understood that the detailed examples outlined above are merely examples. According to embodiments herein, the steps may be presented in a different order to that described herein. Furthermore, additional steps may be incorporated in the method that are not explicitly recited above.

The following numbered paragraphs set out embodiments of the disclosure:

1. A method in a terminal device for a wireless communications network, the terminal device configurable with a plurality of logical channel groups, the method comprising:
   generating buffer status information; and
   transmitting a message to a network node operative in the wireless communications network, the message comprising a buffer status report comprising the buffer status information, the buffer status report comprising:
      respective indications, for each of the plurality of logical channel groups, of the availability of data to transmit in the terminal device for the logical channel group; and
      respective buffer size fields, for one or more of the logical channel groups for which data is available to transmit, indicating an amount of data which is available to transmit.

2. The method according to paragraph 1, wherein the respective indications are arranged in a first order, and wherein the one or more buffer size fields are arranged in a second order which corresponds to the first order.

3. The method according to paragraph 2, wherein the first order is determined according to logical channel group priority values associated with each logical channel group.

4. The method according to paragraph 3, wherein the logical channel group priority values are dedicated priority values for the purpose of determining the first order.

5. The method according to paragraph 2, wherein the first order is determined according to logical channel identity.

6. The method according to paragraph 2, wherein the first order is determined according to logical channel priority values associated with logical channels belonging to the logical channel groups.

7. The method according to paragraph 6, wherein the first order is determined according to the average logical channel priority values for each logical channel group.

8. The method according to paragraph 6, wherein the first order is determined according to the highest logical channel priority value for each logical channel group.

9. The method according to any one of paragraphs 6 to 8, wherein the logical channel priority values are dedicated priority values for the purpose of determining the first order.

10. The method according to any one of paragraphs 6 to 8, wherein the logical channel priority values are logical channel priority values for the purposes of MAC scheduling.

11. The method according to any one of the preceding paragraphs, wherein the message further comprises an indication of the length of the buffer status report.

12. The method according to paragraph 11, wherein the indication of the length of the buffer status report is contained within a sub-header for the buffer status report.

13. The method according to paragraph 12, wherein the indication of the length of the buffer status report comprises a field within the sub-header for the buffer status report.

14. The method according to any one of paragraphs 11 to 13, wherein generating the buffer status information comprises determining the length of the buffer status report based on the number of logical channel groups for which data is available to transmit, and a maximum length of the buffer status report.

15. The method according to paragraph 14, wherein the maximum length is determined based on an amount of resources which have been granted to the terminal device for the transmission of the buffer status report.

In alternative embodiments to that described in paragraph 15, the maximum length may be configured in the terminal device, e.g. through signalling from a network node (e.g. via dedicated signalling, such as RRC signalling; or via broadcast signalling, such as system information).

16. The method according to paragraph 14 or 15, wherein generating the buffer status information comprises, responsive to a determination that a length of a buffer status report comprising respective buffer size fields for each of the logical channel groups for which data is available to transmit would exceed the maximum length, generating buffer size fields for a subset of the logical channel groups for which data is available to transmit such that the buffer status report has a length which is equal to or less than the maximum length.

17. The method according to paragraph 16, wherein the subset comprises one or more logical channel groups associated with a highest priority value or values and omits one or more logical channel groups associated with a lowest priority value or values.

18. The method according to any one of the preceding paragraphs, wherein the buffer status report corresponds to a medium access control, MAC, control element.

19. The method according to any one of the preceding paragraphs, wherein the plurality of indications comprises a bitmap.

20. The method according to paragraph 19, wherein the bitmap is one byte long.

21. The method according to any one of the preceding paragraphs, wherein each buffer size field is one byte long.

22. A method in a network node operative in a wireless communications network, the method comprising:
   receiving a message from a terminal device operative in the wireless communications network, the terminal device being configurable with a plurality of logical channel groups, the message comprising a buffer status report comprising the buffer status information, the buffer status report comprising:
      respective indications, for each of the plurality of logical channel groups, of the availability of data to transmit in the terminal device for the logical channel group; and
      respective buffer size fields, for one or more of the logical channel groups for which data is available to transmit, indicating an amount of data which is available to transmit.

23. The method according to paragraph 22, further comprising:
   based on the buffer status report, scheduling radio resources for the terminal device with which to transmit data.

24. The method according to paragraph 22 or 23, wherein the respective indications are arranged in a first order, and wherein the one or more buffer size fields are arranged in a second order which corresponds to the first order.

25. The method according to paragraph 24, further comprising:
configuring the terminal device with the first order.

26. The method according to paragraph 25, wherein configuring the terminal device with the first order comprises configuring the terminal device with the first order via dedicated signalling or broadcast signalling.

27. The method according to any one of paragraphs 22 to 26, wherein the message further comprises an indication of the length of the buffer status report.

28. The method according to paragraph 27, wherein the indication of the length of the buffer status report is contained within a sub-header for the buffer status report.

29. The method according to paragraph 28, wherein the indication of the length of the buffer status report comprises a field within the sub-header for the buffer status report.

30. The method according to any one of paragraphs 27 to 29, further comprising determining from the indication of the length and the respective indications of the availability of data to transmit that the terminal device is configured with at least one logical channel group for which data is available to transmit and for which the buffer status report comprises no buffer size field.

31. The method according to paragraph 30, further comprising scheduling a default amount of resources for the at least one logical channel group for which data is available to transmit and for which the buffer status report comprises no buffer size field.

32. The method according to any one of paragraphs 22 to 31, wherein the buffer status report corresponds to a medium access control, MAC, control element.

33. The method according to any one of paragraphs 22 to 32, wherein the plurality of indications comprises a bitmap.

34. The method according to paragraph 33, wherein the bitmap is one byte long.

35. The method according to any one of paragraphs 22 to 34, wherein each buffer size field is one byte long.

36. A terminal device for a wireless communications network, the terminal device configurable with a plurality of logical channel groups, the terminal device being configured to:
generate buffer status information; and
transmit a message to a network node operative in the wireless communications network, the message comprising a buffer status report comprising the buffer status information, the buffer status report comprising:
respective indications, for each of the plurality of logical channel groups, of the availability of data to transmit in the terminal device for the logical channel group; and
respective buffer size fields, for one or more of the logical channel groups for which data is available to transmit, indicating an amount of data which is available to transmit.

37. The terminal device according to paragraph 36, further configured to perform the method according to any one of paragraphs 2 to 21.

38. A terminal device for a wireless communications network, the terminal device configurable with a plurality of logical channel groups, and comprising processing circuitry and a non-transitory machine-readable medium storing instructions which, when executed by the processing circuitry, cause the terminal device to:
generate buffer status information; and
transmit a message to a network node operative in the wireless communications network, the message comprising a buffer status report comprising the buffer status information, the buffer status report comprising:
respective indications, for each of the plurality of logical channel groups, of the availability of data to transmit in the terminal device for the logical channel group; and
respective buffer size fields, for one or more of the logical channel groups for which data is available to transmit, indicating an amount of data which is available to transmit.

39. The terminal device according to paragraph 38, wherein the non-transitory machine-readable medium stores further instructions which, when executed by the processing circuitry, cause the terminal device to perform the method according to any one of paragraphs 2 to 21.

40. A terminal device for a wireless communications network, the terminal device configurable with a plurality of logical channel groups, the terminal device comprising:
a generating module configured to generate buffer status information; and
a transmitting module configured to transmit a message to a network node operative in the wireless communications network, the message comprising a buffer status report comprising the buffer status information, the buffer status report comprising:
respective indications, for each of the plurality of logical channel groups, of the availability of data to transmit in the terminal device for the logical channel group; and
respective buffer size fields, for one or more of the logical channel groups for which data is available to transmit, indicating an amount of data which is available to transmit.

41. A network node for a wireless communications network, the network node being configured to:
receive a message from a terminal device operative in the wireless communications network, the terminal device being configurable with a plurality of logical channel groups, the message comprising a buffer status report comprising the buffer status information, the buffer status report comprising:
respective indications, for each of the plurality of logical channel groups, of the availability of data to transmit in the terminal device for the logical channel group; and
respective buffer size fields, for one or more of the logical channel groups for which data is available to transmit, indicating an amount of data which is available to transmit.

42. The network node according to paragraph 41, wherein the network node is further configured to perform the method according to any one of paragraphs 23 to 35.

43. A network node for a wireless communications network, the network node comprising processing circuitry and a non-transitory machine-readable medium storing instructions which, when executed by the processing circuitry, cause the network node to:
receive a message from a terminal device operative in the wireless communications network, the terminal device being configurable with a plurality of logical channel groups, the message comprising a buffer status report comprising the buffer status information, the buffer status report comprising:

respective indications, for each of the plurality of logical channel groups, of the availability of data to transmit in the terminal device for the logical channel group; and respective buffer size fields, for one or more of the logical channel groups for which data is available to transmit, indicating an amount of data which is available to transmit.

44. The network node according to paragraph 43, wherein the non-transitory machine-readable medium stores further instructions which, when executed by the processing circuitry, cause the network node to perform the method according to any one of paragraphs 23 to 35.

45. A network node for a wireless communications network, the network node comprising:

a receiving module configured to receive a message from a terminal device operative in the wireless communications network, the terminal device being configurable with a plurality of logical channel groups, the message comprising a buffer status report comprising the buffer status information, the buffer status report comprising:

respective indications, for each of the plurality of logical channel groups, of the availability of data to transmit in the terminal device for the logical channel group; and respective buffer size fields, for one or more of the logical channel groups for which data is available to transmit, indicating an amount of data which is available to transmit.

The invention claimed is:

1. A method in a terminal device configured for operation in a wireless communications network, the terminal device configurable with a plurality of logical channel groups, the method comprising:

generating a buffer status report, the buffer status report comprising:

a bitmap comprising a plurality of bit positions, each bit position corresponding to a respective one of the logical channel groups according to a defined mapping between the bit positions and the logical channel groups and the bit in each bit position being asserted or not asserted in dependence on whether the buffer status report includes a buffer size field for the corresponding logical channel group, each included buffer size field indicating an amount of uplink data available for transmission by the terminal device for the corresponding logical channel group; and transmitting the buffer status report to a network node operative in the wireless communications network, wherein:

the defined mapping between the bit positions of the bitmap and the logical channel groups reflects an ordering of the logical channel groups, the same ordering is used for included buffer size fields, and the ordering corresponds to logical channel group priority values associated with each logical channel group.

2. A method in a network node operative in a wireless communications network, the method comprising:

receiving a buffer status report from a terminal device operative in the wireless communications network, the terminal device being configurable with a plurality of logical channel groups, the buffer status report comprising:

a bitmap comprising a plurality of bit positions, each bit position corresponding to a respective one of the logical channel groups according to a defined mapping between the bit positions and the logical channel groups and the bit in each bit position being asserted or not asserted in dependence on whether the buffer status report includes a buffer size field for the corresponding logical channel group, each included buffer size field indicating an amount of uplink data available for transmission by the terminal device for the corresponding logical channel group, wherein:

the defined mapping between the bit positions of the bitmap and the logical channel groups reflects an ordering of the logical channel groups, the same ordering is used for included buffer size fields, and the ordering corresponds to logical channel group priority values associated with each logical channel group.

3. A terminal device configured for operation in a wireless communications network, the terminal device configurable with a plurality of logical channel groups, and comprising processing circuitry and a non-transitory machine-readable medium storing instructions that, when executed by the processing circuitry, cause the terminal device to:

generate a buffer status report comprising:

a bitmap comprising a plurality of bit positions, each bit position corresponding to a respective one of the logical channel groups according to a defined mapping between the bit positions and the logical channel groups and the bit in each bit position being asserted or not asserted in dependence on whether the buffer status report includes a buffer size field for the corresponding logical channel group, each included buffer size field indicating an amount of uplink data available for transmission by the terminal device for the corresponding logical channel group; and transmit the buffer status report to a network node operative in the wireless communications network, wherein:

the defined mapping between the bit positions of the bitmap and the logical channel groups reflects an ordering of the logical channel groups, the same ordering is used for included buffer size fields, and the ordering corresponds to logical channel group priority values associated with each logical channel group.

4. The terminal device according to claim 3, wherein the ordering reflects logical channel priority values associated with logical channels belonging to the logical channel groups.

5. The terminal device according to claim 4, wherein the ordering reflects an average logical channel priority value for each logical channel group or the highest logical channel priority value for each logical channel group.

6. The terminal device according to claim 3, wherein the buffer status report omits a length indicator for indicating a length of the buffer status report, and wherein each included buffer size field is of a fixed length, such that an overall length of the buffer status report is calculable by the network node from the number of bits asserted in the bitmap.

7. The terminal device according to claim 6, wherein the non-transitory machine-readable medium further stores instructions that, when executed by the processing circuitry, cause the terminal device to include a buffer size field in the buffer status report for each logical channel group for which the terminal device has uplink data available for transmission, subject to a limit on a maximum length of the buffer status report.

8. The terminal device according to claim 7, wherein:
the maximum length is determined based on an amount of resources that have been granted to the terminal device for the transmission of the buffer status report; or
the maximum length is configured in the terminal device.

9. The terminal device according to claim 7, wherein the non-transitory machine-readable medium further stores instructions that, when executed by the processing circuitry, cause the terminal device to:
responsive to a determination that including buffer size fields for every logical channel group for which the terminal device has uplink data available for transmission would cause the buffer status report to exceed the maximum length, include only as many of the buffer size fields as can be included in the buffer status report without exceeding the maximum length.

10. The terminal device according to claim 9, further comprising deciding which buffer size fields to include in dependence on priorities associated with the logical channel groups for which the terminal device has uplink data available to transmit.

11. A network node configured to operate in a wireless communications network, the network node comprising processing circuitry and a non-transitory machine-readable medium storing instructions that, when executed by the processing circuitry, cause the network node to:
receive a buffer status report from a terminal device operative in the wireless communications network, the terminal device being configurable with a plurality of logical channel groups, the buffer status report comprising:
a bitmap comprising a plurality of bit positions, each bit position corresponding to a respective one of the logical channel groups according to a defined mapping between the bit positions and the logical channel groups and the bit in each bit position being asserted or not asserted in dependence on whether the buffer status report includes a buffer size field for the corresponding logical channel group, each included buffer size field indicating an amount of uplink data available for transmission by the terminal device for the corresponding logical channel group, wherein:
the defined mapping between the bit positions of the bitmap and the logical channel groups reflects an ordering of the logical channel groups,
the same ordering is used for included buffer size fields, and
the ordering corresponds to logical channel group priority values associated with each logical channel group.

12. The network node according to claim 11, wherein the non-transitory machine-readable medium further stores instructions that, when executed by the processing circuitry, cause the network node to:
based on the buffer status report, schedule radio resources for the terminal device with which to transmit data.

13. The network node according to claim 11, wherein the defined mapping between the bit positions of the bitmap and the logical channel groups reflects an ordering of the logical channel groups and wherein the same ordering is used for included buffer size fields.

14. The network node according to claim 13, wherein the non-transitory machine-readable medium further stores instructions that, when executed by the processing circuitry, cause the network node to indicate the defined mapping to the terminal device.

15. The network node according to claim 11, wherein each included buffer size field is of a fixed length and the method further comprises calculating an overall length of the buffer status report from the number of bits asserted in the bitmap, wherein the non-transitory machine-readable medium further stores instructions that, when executed by the processing circuitry, cause the network node to calculate a length of the buffer status report from the number of bits asserted in the bitmap.

* * * * *